United States Patent [19]

Beach

[11] 3,958,258

[45] May 18, 1976

[54] FLASH SHORTING MECHANISM
[75] Inventor: David Easton Beach, Penfield, N.Y.
[73] Assignee: Eastman Kodak Company, Rochester, N.Y.
[22] Filed: Apr. 10, 1975
[21] Appl. No.: 567,030

[52] U.S. Cl. ............................................... 354/135
[51] Int. Cl.² ......................................... G03B 15/03
[58] Field of Search ............ 354/135, 126; 240/1.3; 310/8.7; 317/DIG. 11

[56] References Cited
UNITED STATES PATENTS

| 3,211,069 | 10/1965 | Rixton | 240/1.3 |
|---|---|---|---|
| 3,710,704 | 1/1973 | Wagner | 354/135 |
| 3,736,854 | 6/1973 | Beach | 354/204 |

FOREIGN PATENTS OR APPLICATIONS

| 2,021,403 | 11/1971 | Germany | 354/135 |

Primary Examiner—L. T. Hix
Assistant Examiner—Alan Mathews
Attorney, Agent, or Firm—T. H. Close

[57] ABSTRACT

A mechanism for minimizing electrostatic flashing of a lamp in a flash array by providing a short circuit across the camera socket terminals until flash firing is desired. The mechanism includes an electrically conductive piezoelectric firing spring connected to one socket terminal and an electrically conductive firing spring latch connected to another socket terminal. A short circuit is provided by engagement of the piezoelectric firing spring and firing spring latch until the piezoelectric firing spring is released to move to its piezoelectric crystal striking position.

7 Claims, 6 Drawing Figures

FLASH SHORTING MECHANISM

CROSS-REFERENCE TO RELATED APPLICATIONS

Reference is made to commonly assigned, copending U.S. Pat. applications Ser. No. 528,529, filed Nov. 29, 1974 in the names of Jerry L. Hargrave and Harold L. Malone and entitled CAMERA FLASH SOCKET; Ser. No. 528,528, filed Nov. 29, 1974 in the name of Robert F. O'Brien and entitled PIEZO CRYSTAL HOUSING AND MOUNT and Ser. No. 528,305, filed Nov. 28, 1974 in the names of Jeffrey R. Stoneham and Thomas E. Dussinger, and entitled FILM ADVANCE-FLASH INTERLOCK MECHANISM.

BACKGROUND OF THE INVENTION

1. Field of the Invention

The present invention relates to photographic apparatus and, in particular, to a mechanism for minimizing electrostatic firing of a lamp in a flash array adapted for use with photographic apparatus.

2. Description of the Prior Art

It is known in the photographic arts to provide for the ignition of a flashlamp by means of an electric pulse generated by a piezoelectric crystal and to provide for the synchronization of such flash ignition with shutter operation of a camera. See U.S. Pat. Nos. 2,856,564; 2,972,937 and 3,106,080. More recently, apparatus has been developed in which a plurality of flashlamps, fireable by electric energy generated by a piezoelectric crystal, are assembled into a multilamp array. In one such array, as is disclosed more fully in the referenced, co-pending Application Ser. No. 528,529, entitled CAMERA FLASH SOCKET, all of the lamps are aligned in the same direction and each lamp has its own reflector, with a switching mechanism internal to the array for firing a particular lamp.

A lamp designed to be fired by electrical energy generated by a piezoelectric crystal is susceptible to premature firing by electrostatic discharge. It is desirable, therefore, to provide a mechanism for minimizing the possibility of electrostatic firing of such a lamp in a flash array.

SUMMARY OF THE INVENTION

The present invention provides photographic apparatus including a shutter actuator, a piezoelectric firing spring, a firing spring latch and flash socket terminals. In a preferred embodiment, the firing spring latch and piezoelectric firing spring are each made of an electrically conductive material and are each connected to one of the camera flash socket terminals. When the piezoelectric firing spring is held in its latched position, a short circuit is established between the camera socket terminals. Upon release of the piezoelectric firing spring by the firing spring latch, the piezoelectric firing spring moves to its piezoelectric crystal striking position and the short circuit is automatically disconnected.

DESCRIPTION OF THE DRAWINGS

In the detailed description of the photographic apparatus presented below, reference is made to the accompanying drawings, in which.

DESCRIPTION OF THE PREFERRED EMBODIMENT

Figure 1:
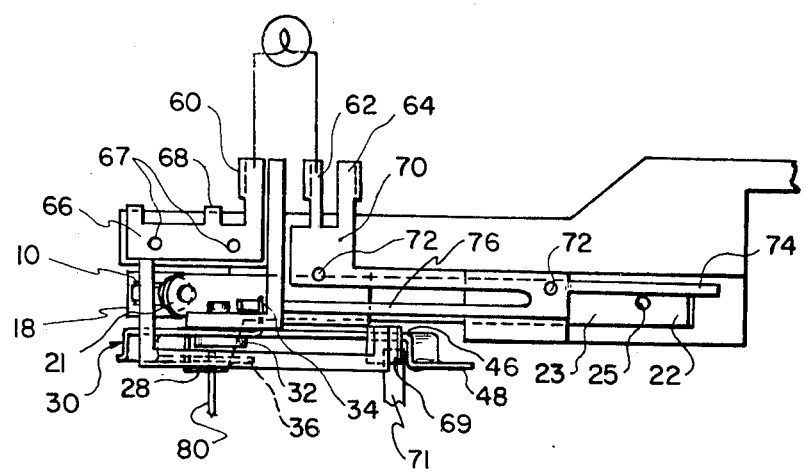
FIG. 1 is a front view of a portion of a camera incorporating the mechanism of the present invention.

Because photographic apparatus is well known, the present description will be directed in particular to elements forming part of, or cooperating more directly with, the present invention. Elements not specifically shown or described herein are understood to be selectable from those known in the art.

Referring now to the drawings, a photographic camera is illustrated, in part, which includes a piezoelectric generator 10, a piezoelectric firing spring 20, a latch 30, a film advance mechanism 50 and a shutter actuator 80. Piezoelectric generator 10 includes a piezoelectric crystal 12, first anvil 14 and second anvil 15. Piezoelectric generator 10 is formed by inserting second anvil 15, piezoelectric crystal 12 and first anvil 14 into a recess 16 within the camera. Piezoelectric generator 10 is retained within the camera by means of a spring clip 18 that engages a portion of first anvil 14 along with a pair of retaining lugs 19 that are fixed within the camera. Alternatively, piezoelectric generator 10 could be pre-assembled into a unitary package for insertion into recess 16 within the camera, such as is described more fully in referenced, U.S. application Ser. No. 528,528, entitled PIEZO CRYSTAL HOUSING AND MOUNT.

Piezoelectric firing spring 20 is an elongated leaf spring having ends 21 and 22 and opposite surfaces 23 and 24. Piezoelectric firing spring 20 is movably mounted within the camera by means of a pin 25, which is fixed within the camera and which is received in an opening in end 22, and by a knife edge 27, which bears against surface 23 of piezoelectric firing spring 20 between ends 21 and 22 to provide a fulcrum. A hammer 26 is mounted on surface 24 of piezoelectric firing spring 20 near end 21, which also includes a latching lug 28 adjacent hammer 26. Piezoelectric firing spring 20 and hammer 26 are made of electrically conductive materials.

Latch 30 is movably mounted on a pin 32, fixed within the camera, and includes a spring lug 34, a first arm 36 having a first cam surface 38, a second arm 40 having a second cam surface 42 and a latch surface 44, and a third arm 46 terminating in a pawl 48. Latch 30 is made of an electrically conductive material.

Mounted within the camera is a film advance mechanism 50, which includes a film advance slide 52 having a rack gear 54. Film advance mechanism 50 is biased to the left to a rest position by a spring 56. Rack gear 54 is designed to engage with and drive the film advance gear train of the camera during operation of film advance mechanism 50 by the photographer. Many such film advance gear trains are known in the art, such as is shown in U.S. Pat. No. 3,736,854, and any of these may be utilized with the film advance-flash interlock mechanism of the present invention.

Figure 2:
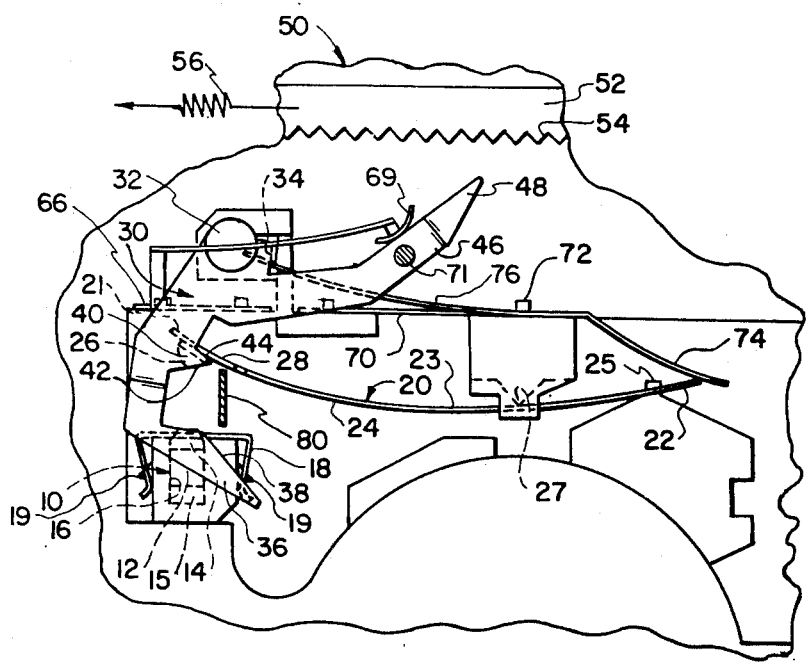
FIG. 2 is a top view of the mechanism illustrated in FIG. 1 with the piezoelectric firing spring in its latched position.
Figure 4:
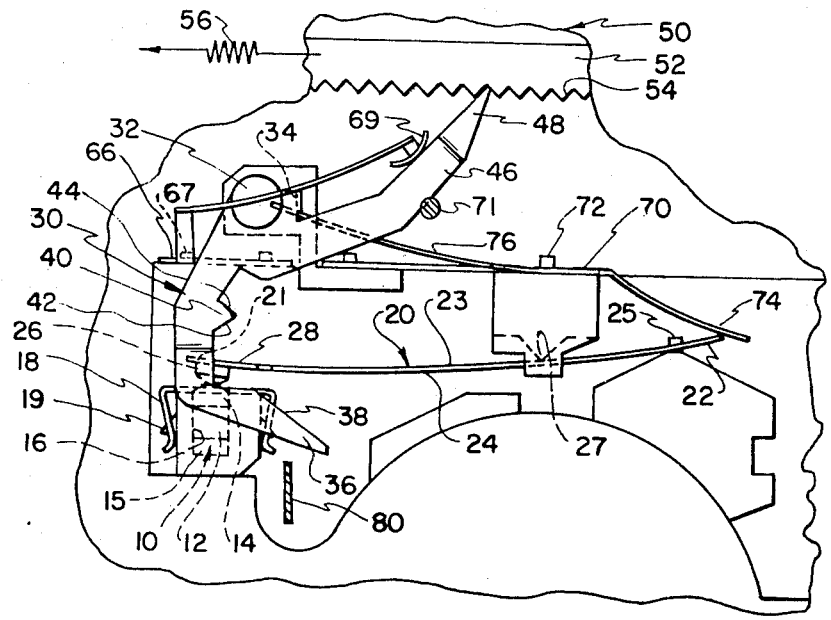
FIG. 4 is a top view of the mechanism with the piezoelectric firing spring in its striking position.
Figure 5:
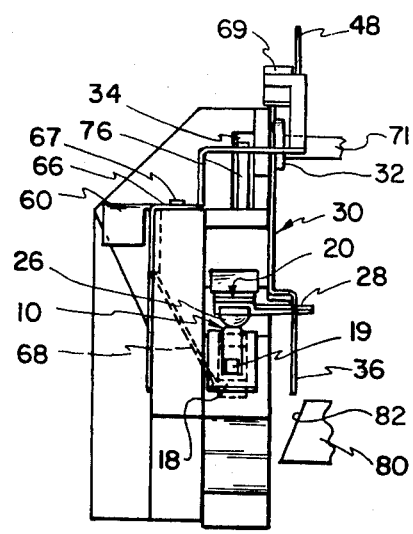
FIG. 5 is a side view of the mechanism as illustrated in FIG. 4.
Figure 6:
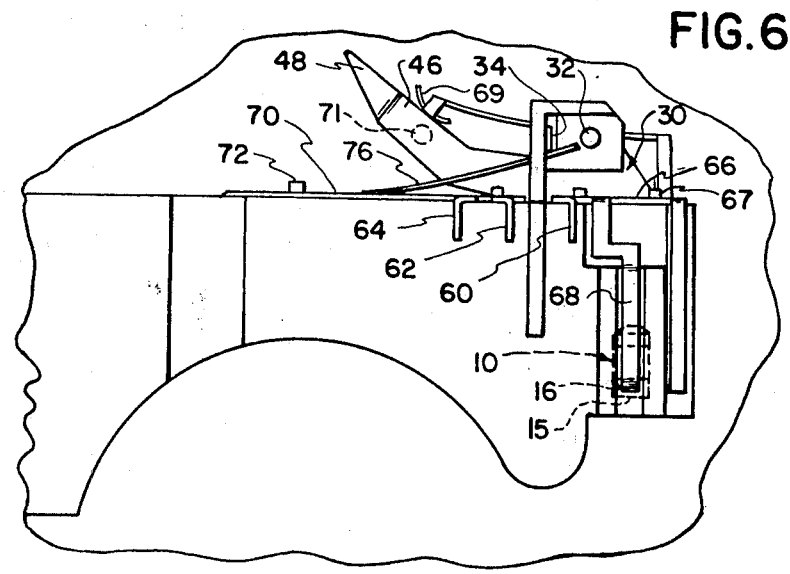
FIG. 6 is a rear view of the mechanism as illustrated in FIGS. 1–3.

FIG. 1 also illustrates the electrical connection of piezoelectric generator 10 to a flash unit which, while not essential to the operation of the electrostatic flash preventing mechanism of the present invention, may be used with that mechanism. In the flash socket of the camera, as is more fully disclosed in the referenced co-pending U.S. Pat. application Ser. No. 528,529, entitled CAMERA FLASH SOCKET, three contacts are provided, 60, 62 and 64. Contact 60 is integrally formed with a contact strip 66, fixedly mounted within the camera by pins 67, with a resilient portion 68 that is biased into contact with a portion of second anvil 15 (FIG. 5) and with a resilient portion 69 that is biased into contact with a portion of latch 30 when latch 30 is in its latching position (FIGS. 1–14 3). Contacts 62 and 64 are joined to a common contact strip 70, fixedly mounted within the camera by means of pins 72, that includes a contact end 74 and a spring end 76. As best seen in FIGS. 2 and 4, contact end 74 is urged into engagement with end 22 of piezoelectric firing spring 20 by means of their resiliency. As has been noted, piezoelectric firing spring 20 and hammer 26 are formed of electrically conducting materials so that, when hammer 26 strikes first anvil 14, electrical connection is established between first anvil 14 and contacts 62 and 64 through hammer 26, piezoelectric firing spring 20, end 22 and contact end 74 to contact strip 70. Alternatively, electrical connection may be established between latch 30 and contact 60 through resilient portion 69 and between latch 30 and contact 62 through piezoelectric firing spring 20. Thus, when piezoelectric firing spring 20 is engaged by latch surface 44 on latch 30, an electrical short circuit is established between contact 60 and contact 62 through contact strip 70, piezoelectric firing spring 20, latch 30 and resilient portion 69 on contact strip 66. If a multilamp flash array is present in the camera socket, electrostatic charge build-up is prevented by means of the short circuit and, if a flash array is inserted in the socket, any charge buildup in the array will be dissipated by the short circuit. For flash operation, electrical connection is established between second anvil 15 and contact 60 through resilient portion 68 and contact strip 66. Thus, when hammer 26 strikes first anvil 14, an electrical circuit is completed for directing an electrical pulse from piezoelectric generator 10 to contacts 60 and 62 in the camera socket. Spring end 76 engages spring lug 34 and biases latch 30 in a counterclockwise direction about pin 32.

Figure 3:
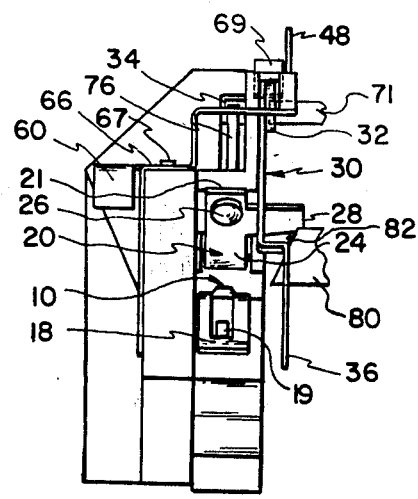
FIG. 3 is a side view of the mechanism as illustrated in FIGS. 1 and 2.

The flash actuating mechanism, as illustrated in FIGS. 1–3, is in its latched position. Latch surface 44 engages latching lug 28 and retains piezoelectric firing spring 20 in its latched position in which piezoelectric firing spring 20 is flexed across knife-edge 27. Simultaneously, spring end 76 biases latch 30 in a counterclockwise direction to retain piezoelectric firing spring 20 in its latched position. It should be noted that piezoelectric firing spring 20 may be flexed in both its latched position (FIGS. 1–3) and its striking position (FIGS. 4–6) so that it may be held within the camera by pin 25 and knife-edge 27.

When the operator desires to take a flash illuminated picture, a multilamp flash array or electronic flash unit is inserted in the camera socket. During subsequent exposure operation of the camera, a shutter actuator or high energy lever is released to move to actuate the shutter. Many such mechanisms are known in the art, such as the high energy lever described in U.S. Pat. No. 3,736,854, and the disclosure of that U.S. Pat. is Patent incorporated by reference. A portion of the shutter actuator, or high energy lever, shown generally as 80, will be moved in a downward direction into contact with the first cam surface 38 on first arm 36 of latch 30. Continued downward movement of shutter actuator 80 will cause clockwise rotation of latch 30 about pin 32 against the bias of spring end 76 until latch surface 44 is disengaged from latching lug 28 on piezoelectric firing spring 20. Piezoelectric firing spring 20 is now free to move to its striking position (FIG. 4) in which hammer 26 strikes first anvil 14, thereby causing generation of electrical energy by piezoelectric crystal 12. Simultaneously with clockwise movement of latch 30 about pin 32 to release piezoelectric firing spring 20 for movement toward its striking position, resilient portion 69 will engage a stop 71 fixed in the camera and will be disengaged from contact with latch 30. Disengagement of resilient portion 69 and piezoelectric firing spring 20 from latch 30 will open the electrical short circuit. As has been described before, the generated electric pulse will be transmitted through hammer 26 and piezoelectric firing spring 20 to contact strip 70 and through resilient portion 68 to contact strip 66. The electrical pulse will thus be presented across contacts 60 and 62 to fire the flash lamp or electronic flash unit. In the event that no flash unit is present in the camera socket, the pulse will still be presented across contacts 60 and 62 but will not be utilized.

After release of piezoelectric firing spring 20, latch 30 moves to its unlatched position as best seen in FIG. 4, under the bias of spring end 76 against spring lug 34. Hammer 26 has struck first anvil 14. Pawl 48 on third arm 46 is in engagement with rack gear 54 on film advance slide 52 and resilient portion 69 is engaged with latch 30. For subsequent operation of the camera, the operator will actuate film advance mechanism 50 so as to move film slide 52 and rack gear 54 to the right against the bias of spring 56. Such movement is permissible since rack gear 54 will merely move pawl 48 against the bias of spring end 76 on spring lug 34. However, return movement of film advance slide 52 to the left is not possible, so long as pawl 48 engages rack gear 54. Operation of film advance mechanism 50 moves shutter actuator 80 upwardly using any well known coupling mechanism, such as that of U.S. Pat. No. 3,736,854. Initial upward movement of shutter actuator 80 brings cam surface 82 into engagement with first arm 36 which flexes to permit shutter actuator 80 to pass. Further movement brings shutter actuator 80 into engagement with latch lug 28 on piezoelectric firing spring 20 and will cause upward movement of piezoelectric firing spring 20. Latching lug 28 will come into contact with second cam surface 42 on second arm 40, thereby causing latch 30 to be rotated in a clockwise direction against the bias of spring end 76 against spring lug 34. Continued upward movement of shutter actuator 80 and continued clockwise rotation of latch 30 will move latching lug 28 past the end of second cam surface 42. When this occurs, spring end 76 urges latch 30 in a counterclockwise direction to cause engagement of latch surface 44 with latching lug 28 and to bring resilient portion 69 into engagement with latch 30. Movement of latch 30 in a clockwise direction by engagement of latching lug 28 and second cam surface 42 will remove pawl 48 from engagement with rack gear 54 on film advance slide 52. The engagement of pawl 48 with rack gear 54 prevents short stroke operation of film advance slide 52 prior to movement of piezoelectric firing spring 20 to its latched position in which pawl 48 is disengaged from rack gear 54. Film advance slide 52 may now return to the left to its rest position under the bias of spring 56. The mechanism will once again be in the position illustrated in FIGS. 1–3, with a short circuit established across camera socket terminals 60 and 62, ready for subsequent picture taking operation of the camera.

The invention has been described in detail with particular reference to a preferred embodiment thereof, but it will be understood that variations and modifications can be effected within the spirit and scope of the invention.

I claim:

1. A photographic camera adapted for use with a flash unit, said camera comprising:
   means, including a piezoelectric crystal, for generating electrical energy;
   means for striking said generating means and thereby generating electrical energy;
   means for retaining said striking means in a latched condition and for releasing said striking means for movement from said latched condition to strike said generating means;
   means, including a pair of socket terminals electrically connected to said generating means, for directing generated electrical energy to a flash unit; and
   means for electrically connecting said socket terminals whenever said striking means is in said latched condition and for electrically disconnecting said socket terminals whenever said striking means is not in said latched condition.

2. A photographic camera as in claim 1 wherein said striking means includes a movable member made of an electrically conductive material.

3. A photographic camera as in claim 1 wherein said retaining and releasing means includes a movable member made of an electrically conductive material.

4. A photographic camera for use with a flash unit, said camera comprising:
   means, including a piezoelectric crystal, for generating electrical energy;
   a firing member including a hammer mounted thereon, said firing member being movable from a latched position to bring said hammer into engagement with said generating means and thereby generate electrical energy;
   a latch movable from a latching position to an unlatching position, said latch retaining said firing member in said latched position when said latch is in said latching position;
   means, including a movable member, for moving said firing member to said latched position and for moving said latch to said unlatching position;
   means, including a pair of socket terminals electrically connected to said generating means, for providing generated electrical energy to a flash unit; and
   means for electrically connecting said socket terminals whenever said firing member is in said latched position and for electrically disconnecting said socket terminals whenever said firing member is not in said latching position.

5. A photographic camera as in claim 4 wherein said firing member is made of an electrically conductive material.

6. A photographic camera as in claim 4 wherein said latch is made of an electrically conductive material.

7. A photographic camera adapted for use with a flash unit, said camera comprising:
   means, including a piezoelectric crystal, for generating electrical energy;
   a firing spring made of an electrically conductive material and having a hammer mounted thereon, said firing spring being movable from a latched position to bring said hammer into engagement with said generating means and thereby generate electrical energy;
   a latch made of an electrically conductive material and movable between a latching and an unlatching position, said latch retaining said firing spring in said latched position when said latch is in said latching position and said latch releasing said firing spring when moved toward said unlatching position;
   a member movable to engage and move said firing spring to its latched position and further movable to engage and move said latch to its unlatching position;
   means for moving said movable member;
   means, including a pair of socket terminals electrically connected to said generating means, for directing generated electrical energy to a flash unit; and
   means for connecting said firing spring to one of said socket terminals when said firing spring is in said latched position and for connecting said latch to the other of said socket terminals when said latch is in said latching position.

* * * * *